United States Patent
Kim et al.

(10) Patent No.: US 9,712,077 B2
(45) Date of Patent: Jul. 18, 2017

(54) ACTIVE RECTIFIER AND CIRCUIT FOR COMPENSATING FOR REVERSE CURRENT LEAKAGE USING TIME DELAY SCHEME FOR ZERO REVERSE LEAKAGE CURRENT

(71) Applicants: Samsung Electronics Co., Ltd., Suwon-si (KR); Industry-University Cooperation Foundation Hanyang University, Seoul (KR)

(72) Inventors: Dong Zo Kim, Yongin-si (KR); Sang Wook Kwon, Seongnam-si (KR); Ki Young Kim, Yongin-si (KR); Bong Chul Kim, Seoul (KR); Young Jin Moon, Gwangju (KR); Jae Hyun Park, Yongin-si (KR); Chang Sik Yoo, Seoul (KR); Byoung Hee Lee, Yongin-si (KR)

(73) Assignees: Samsung Electronics Co., Ltd., Suwon-si (KR); Industry-University Cooperation Foundation Hanyang University, Seoul (KR)

( * ) Notice: Subject to any disclaimer, the term of this patent is extended or adjusted under 35 U.S.C. 154(b) by 275 days.

(21) Appl. No.: 14/326,829

(22) Filed: Jul. 9, 2014

(65) Prior Publication Data

US 2015/0146466 A1  May 28, 2015

(30) Foreign Application Priority Data

Nov. 22, 2013  (KR) ......................... 10-2013-0143181

(51) Int. Cl.
*H02H 7/125* (2006.01)
*H02M 7/219* (2006.01)

(52) U.S. Cl.
CPC .... *H02M 7/219* (2013.01); *H02M 2007/2195* (2013.01); *Y02B 70/1408* (2013.01)

(58) Field of Classification Search
USPC ............................. 363/52–53, 123, 125–127
See application file for complete search history.

(56) References Cited

U.S. PATENT DOCUMENTS

| | | | | |
|---|---|---|---|---|
| 5,017,800 A * | 5/1991 | Divan | ..................... | H02J 9/062 307/66 |
| 5,550,463 A * | 8/1996 | Coveley | .................... | G05F 1/56 315/194 |
| 5,663,635 A * | 9/1997 | Vinciarelli | ............ | H02M 3/155 323/224 |
| 6,400,095 B1 * | 6/2002 | Primisser | ........... | H05B 41/2985 315/121 |
| 6,919,746 B2 * | 7/2005 | Suzuki | .................... | H03L 7/095 327/157 |
| 8,575,881 B2 * | 11/2013 | Hiltbold | .................... | H02P 1/42 318/438 |

(Continued)

*Primary Examiner* — Adolf Berhane
*Assistant Examiner* — Nusrat Quddus
(74) *Attorney, Agent, or Firm* — NSIP Law

(57) ABSTRACT

A method of compensating for reverse current leakage in an active rectifier may include advancing an output of a comparator by a predetermined period of time by applying a predetermined offset voltage to a reference voltage input to the comparator, and activating a switch based on the output of the comparator. The method may also include deactivating the switch when a predetermined time delay elapses from a point in time at which the switch was activated.

23 Claims, 15 Drawing Sheets

(56) References Cited

U.S. PATENT DOCUMENTS

| | | | |
|---|---|---|---|
| 9,018,931 B2* | 4/2015 | Bridge | H02J 7/0031 323/311 |
| 2010/0046259 A1* | 2/2010 | Ho | H02M 7/217 363/126 |
| 2010/0046264 A1* | 2/2010 | Ho | H02M 7/219 363/127 |
| 2010/0109443 A1* | 5/2010 | Cook | H01Q 1/2225 307/104 |
| 2010/0188876 A1* | 7/2010 | Garrity | H02M 1/4225 363/127 |
| 2013/0034255 A1* | 2/2013 | Parker | H04R 1/2857 381/338 |
| 2016/0049857 A1* | 2/2016 | Zhang | H02M 1/00 363/127 |

* cited by examiner

ACTIVE RECTIFIER AND CIRCUIT FOR COMPENSATING FOR REVERSE CURRENT LEAKAGE USING TIME DELAY SCHEME FOR ZERO REVERSE LEAKAGE CURRENT

CROSS-REFERENCE TO RELATED APPLICATIONS

This application claims the benefit under 35 USC 119(a) of Korean Patent Application No. 10-2013-0143181 filed on Nov. 22, 2013, in the Korean Intellectual Property Office, the entire disclosure of which is incorporated herein by reference for all purposes.

BACKGROUND

1. Field

The following description relates to a technology of enhancing an efficiency of an active rectifier.

2. Description of Related Art

A resonance power is electromagnetic energy. A resonance power transmission system is a type of wireless power transmission system, and includes a source device configured to transmit a resonance power and a target device configured to receive the resonance power. The resonance power is wirelessly transmitted from the source device to the target device.

When a wireless power receiver as a target device in the wireless power transmission system uses a typical passive rectifier, the passive rectifier rectifies an input signal to have a value obtained by subtracting a voltage drop caused by a diode included in the passive rectifier from a peak voltage of the input signal. A rectifier in the wireless power receiver may be a very important factor to determine a power transmission efficiency.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a circuit for compensating for reverse current leakage in an active rectifier includes a switch configured to control a current flow in the active rectifier and interrupt the current flow in response to the switch being deactivated; and a reverse current leakage compensator configured to deactivate the switch in response to a predetermined time delay elapsing from a point in time at which the switch is activated.

The reverse current leakage compensator may include a rising edge detector configured to detect a rising edge; a delay unit configured to output a signal delayed from the rising edge by the predetermined time delay; and a set-reset (SR) latch configured to output a control signal in response to the rising edge and the signal delayed from the rising edge.

The reverse current leakage compensator may include a comparator configured to output a comparison result obtained by comparing an input signal to a reference voltage; an inverter configured to invert the output of the comparator; a capacitor configured to delay an output of the inverter by the predetermined time delay; and a negated AND (NAND) gate configured to output a control signal in response to the output of the inverter delayed by the capacitor and the output of the comparator.

The reverse current leakage compensator may include a comparator configured to adjust a reference voltage by a predetermined offset voltage to advance an output of the comparator by a predetermined period of time; and the switch may be further configured to be activated based on an output of the comparator.

The predetermined offset voltage may be applied by a resistor divider.

The predetermined offset voltage may be applied by a diode.

In another general aspect, an active rectifier includes a first loop configured to enable a current to flow in the first loop, the first loop being activated in an interval in which an input signal has a positive phase; and a second loop configured to enable a current to flow in the second loop, the second loop being activated in an interval in which the input signal has a negative phase; wherein each of the first loop and the second loop includes a switch and a controller configured to generate a control signal to deactivate the switch in response to a predetermined time delay elapsing from a point in time at which the switch is activated.

The controller may include a rising edge detector configured to detect a rising edge of the input signal; a delay unit configured to output a signal delayed from the rising edge by the predetermined time delay; and a set-reset (SR) latch configured to output a control signal in response to the rising edge and the signal delayed from the rising edge.

The controller may include a comparator configured to output a comparison result obtained by comparing the input signal to a reference voltage; an inverter configured to invert the output of the comparator; a capacitor configured to delay an output of the inverter by the predetermined time delay; and a negated AND (NAND) gate configured to output a control signal in response to the output of the inverter delayed by the capacitor and the output of the comparator.

The controller may include a comparator configured to adjust a reference voltage by a predetermined offset voltage to advance an output of the comparator by a predetermined period of time, the output being obtained by comparing the input signal to the adjusted reference voltage; and the switch may be configured to be activated based on an output of the comparator.

The predetermined offset voltage may be applied by a resistor divider.

The predetermined offset voltage may be applied by a diode.

In another general aspect, an active rectifier includes a first loop configured to store a power of an interval in which an input signal has a positive phase; and a second loop configured to store a power of an interval in which the input signal has a negative phase; wherein each of the first loop and the second loop may be further configured to deactivate a switch configured to control the active rectifier in response to a predetermined time delay elapsing from a point in time at which the switch is activated to compensate for reverse current leakage.

The first loop may include a first switch configured to enable a current to flow in the first loop in response to the input signal in the interval in which the input signal has the positive phase; and a first delay switch configured to interrupt a current flowing in the first loop in the interval in which the input signal has the positive phase in response to a predetermined time delay elapsing from a point in time at which the first delay switch is activated.

The first delay switch may include a rising edge detector configured to detect a rising edge of the input signal; a delay unit configured to output a signal delayed from the rising edge by the predetermined time delay; and a set-reset (SR) latch configured to output a control signal in response to the rising edge and the signal delayed from the rising signal.

The first delay switch may include a comparator configured to output a comparison result obtained by comparing the input signal to a reference voltage; an inverter configured to invert the output of the comparator; a capacitor configured to delay an output of the inverter by the predetermined time delay; and a negated AND (NAND) gate configured to output a control signal in response to the output of the inverter delayed by the capacitor and the output of the comparator.

The second loop may include a second switch configured to enable a current to flow in the second loop in response to the input signal in the interval in which the input signal has the negative phase; and a second delay switch configured to interrupt a current flowing in the second loop in the interval in which the input signal has the negative phase in response to a predetermined time delay elapsing from a point in time at which the second delay switch is activated.

The second delay switch may include a rising edge detector configured to detect a rising edge of the input signal; a delay unit configured to output a signal delayed from the rising edge by the predetermined time delay; and a set-reset (SR) latch configured to output a control signal in response to the rising edge and the signal delayed from the rising edge.

The second delay switch may include a comparator configured to output a comparison result obtained by comparing the input signal to a reference voltage; an inverter configured to invert the output of the comparator; a capacitor configured to delay an output of the inverter by the predetermined time delay; and a negated AND (NAND) gate configured to output a control signal in response to the output of the inverter delayed by the capacitor and the output of the comparator.

In another general aspect, a circuit for compensating for reverse current leakage in an active rectifier includes a switch configured to control a flow of current in the active rectifier; and a controller configured to turn off the switch to interrupt a current flowing in the active rectifier while compensating for a switch turn-off delay time of the controller to compensate for reverse current leakage in the active rectifier.

The controller may include a comparator configured to compare an input voltage of the active rectifier to a reference voltage; the controller may be further configured to turn off the switch after a predetermined time delay has elapsed after the switch was turned on; and the predetermined time delay may be selected so that the switch is turned off at a point in time at which the input voltage is equal to the reference voltage to compensate for the switch turn-off delay time of the active rectifier and compensate for the reverse current leakage in the active rectifier.

The controller may be further configured to turn on the switch to enable a current to flow in the active rectifier while compensating for a switch turn-on delay time of the controller to increase a power conversion efficiency of the active rectifier.

The controller may include a comparator configured to compare an input voltage of the active rectifier to a reference voltage; and a reference voltage adjuster configured to apply a predetermined offset voltage to the reference voltage; the controller may be further configured to turn on the switch based on an output of the comparator; and the predetermined offset voltage may be selected so that the switch is turned on at a point in time at which the input voltage is equal to the reference voltage to increase the power conversion efficiency of the active rectifier and compensate for the switch turn-on delay time of the controller.

Other features and aspects will be apparent from the following detailed description, the drawings, and the claims.

DETAILED DESCRIPTION

Figure 1:
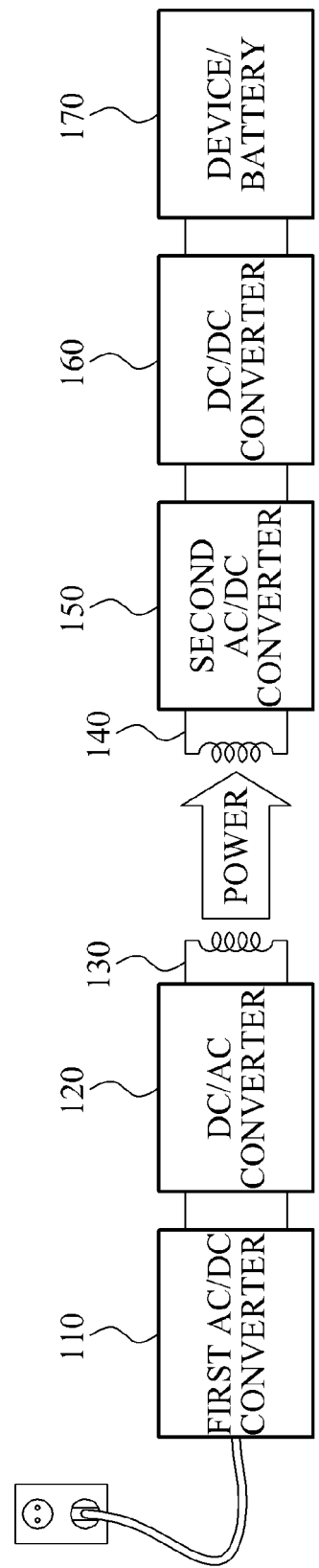
FIG. 1 illustrates an example of a wireless power transmission system using magnetic resonance according to a related art.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 1 illustrates an example of a wireless power transmission system using magnetic resonance according to a related art.

In the wireless power transmission system of FIG. 1, a transmitter transmits an alternating current (AC) high-frequency power, for example a radio frequency (RF) power, to a receiver using magnetic resonance. In a device and/or battery (device/battery) 170 in the receiver that receives the AC high-frequency power, a direct current (DC) voltage may be required to operate or charge the device/battery 170. To convert an AC input voltage of the AC high-frequency power received from the transmitter to a DC voltage, a rectifier operating as a second AC-to-DC (AC/DC) converter 150 may be used. The AC high-frequency power may be referred to as an AC power.

The transmitter includes a first AC/DC converter 110, a DC-to-AC (DC/AC) converter 120, and a source resonator 130.

The first AC/DC converter 110 converts an AC input voltage of an AC power source to a DC voltage having a predetermined magnitude. The DC/AC converter 120 converts the DC voltage to an AC voltage. The source resonator 130 magnetically resonates with a target resonator 140 in the receiver to wirelessly transmit the AC voltage as an AC power to the receiver.

The receiver includes the target resonator 140, the second AC/DC converter 150, a DC-to-DC (DC/DC) converter 160, and the device/battery 170.

The target resonator 140 magnetically resonates with the source resonator 130 to wirelessly receive the AC power from the transmitter. The second AC/DC converter 150 converts the AC voltage of the received AC power to a DC voltage. The DC/DC converter 160 converts the DC voltage to a DC voltage having a magnitude suitable for the device/battery 170. The device/battery 170 is operated or charged by a DC power supplied from the DC/DC converter 160.

Figure 2:
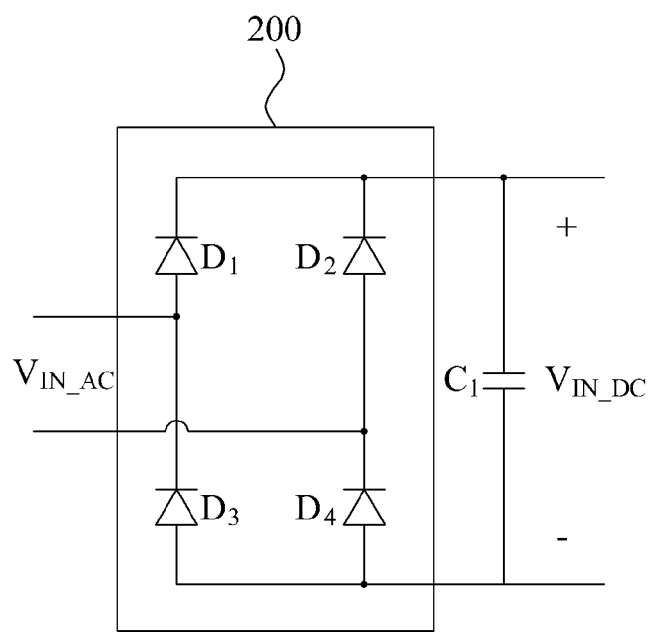
FIG. 2 illustrates an example of a structure of a passive rectifier according to a related art.
Figure 3:
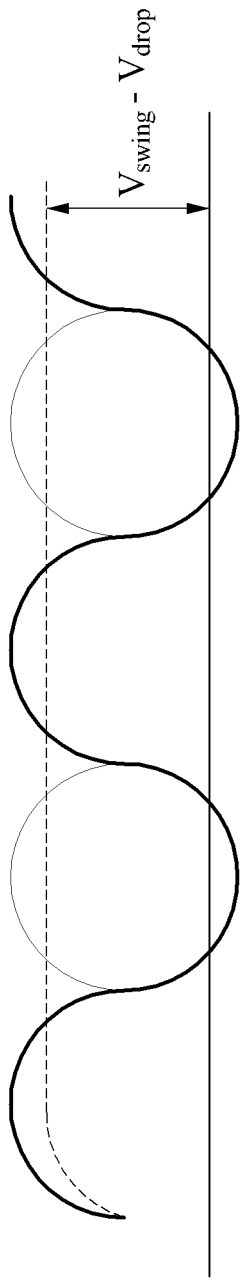
FIG. 3 illustrates an example of rectification performed by the passive rectifier of FIG. 2.

FIG. 2 illustrates an example of a structure of a passive rectifier 200 according to a related art. FIG. 3 illustrates an example of rectification performed by the passive rectifier 200.

The second AC/DC converter 150 of FIG. 1 may include, for example, a rectifier. For example, when the passive rectifier 200 is used, an AC input voltage $V_{IN\_AC}$ is rectified to have a value obtained by subtracting a voltage drop $V_{drop}$ of the passive rectifier 200 (for example, a voltage drop of two diodes) from a peak-to-peak swing $V_{swing}$ of the AC input voltage $V_{IN\_AC}$ as illustrated in FIG. 3. In this example, an output voltage $V_{IN\_DC}$ of the passive rectifier 200 has value equal to $V_{swing} - V_{drop}$.

For example, referring to FIG. 2, a voltage drop $V_{drop}$ of each of diodes $D_1$, $D_2$, $D_3$, $D_4$ may be assumed to be 0.7 volts (V), and a peak-to-peak swing $V_{swing}$ of the AC input voltage $V_{IN\_AC}$ may be assumed to be 10 V. In this example, the passive rectifier 200 rectifies the AC input voltage $V_{IN\_AC}$, and outputs the output voltage $V_{IN\_DC}$ having a magnitude of 8.6 V obtained by subtracting the voltage drop $V_{drop}$ of 1.4 V (=2×0.7 V) from the peak-to-peak swing $V_{swing}$ of 10 V.

A performance of a rectifier may be represented as a power conversion efficiency. For example, the power conversion efficiency may be represented as a ratio of an output voltage to a peak-to-peak swing of an AC input voltage. A diode rectifier may obtain a maximum power conversion efficiency in the above example of 86% (=(8.6 V/10 V)×100%). For example, when the peak-to-peak swing of the AC input voltage is reduced to 5 V due to an increase in a distance between a wireless power transmitter and a wireless power receiver, the maximum power conversion efficiency is reduced to 72% (=3.6 V/5 V)×100%).

As described above, a rectifier of a receiver may determine a total power transmission efficiency of a wireless power transmission system, and accordingly a power conversion efficiency of the rectifier should be maximized to maximize the total power transmission efficiency. To reduce a diode voltage drop of the passive rectifier 200, a Schottky diode may be used, because a voltage drop of the Schottky diode is less than a voltage drop of a general P-N diode.

The Schottky diode has a voltage drop of about 0.4 V. However, when a current capacity increases, an amount of heat generated in the Schottky diode increases, and accordingly the voltage drop in the Schottky diode also increases. The voltage drop increases due to an increase in the amount of heat generated in the Schottky diode, and accordingly a power loss of the rectifier increases.

Due to the increase in the power loss of the rectifier, it may be difficult to apply the passive rectifier 200 to a rectifier of a wireless power transmission field of a latest mobile application requiring a charging current of at least 1 ampere (A).

A synchronous rectifier using a metal-oxide-semiconductor (MOS) transistor having a small voltage drop may be applied to a rectifier in a mobile application field. For example, the synchronous rectifier may be applied to an application that consumes a power not exceeding tens of milliwatts (mW), for example, a radio frequency identification (RFID), a medical implant, and other low-power devices. Hereinafter, the synchronous rectifier will be referred to as an "active rectifier."

Figure 4:
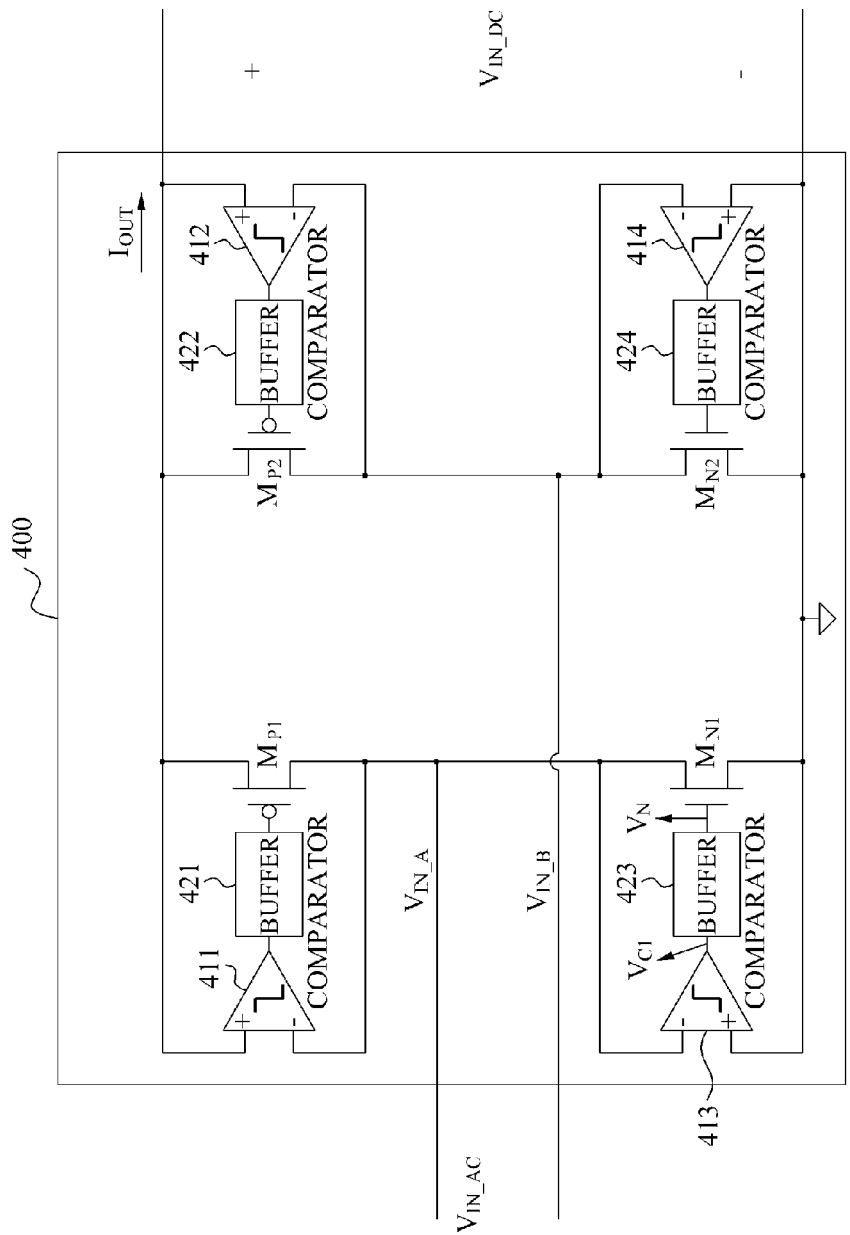
FIG. 4 illustrates an example of an active rectifier according to a related art.

FIG. 4 illustrates an example of an active rectifier 400 according to a related art.

The active rectifier 400 of FIG. 4 uses MOS transistors. If a voltage drop of the active rectifier 400 is assumed to be an ideal value of 0 V, the active rectifier 400 will obtain a power conversion efficiency of 100%.

Referring to FIG. 4, comparators 411, 412, 413, 414 compare an AC input voltage $V_{IN\_AC}$ to a ground voltage, or to an output voltage of the active rectifier 400, and determine a point in time at which each of n-channel MOS (NMOS) transistors $M_{N1}$ and $M_{N2}$ and p-channel MOS (PMOS) transistor $M_{P1}$ and $M_{P2}$ is turned on or off. For example, the comparators 411 to 414 compare the AC input voltage $V_{IN\_AC}$ to a reference voltage, and determine the points in time. Voltages of terminals of the AC input voltage $V_{IN\_AC}$ are indicated by $V_{IN\_A}$ and $V_{IN\_B}$.

Additionally, buffers 421, 422, 423, 424 are used to increase a current drive efficiency to turn on or off a transistor having a large size.

The output voltage of the active rectifier 400 is represented as a DC voltage $V_{IN\_DC}$.

Figure 5:
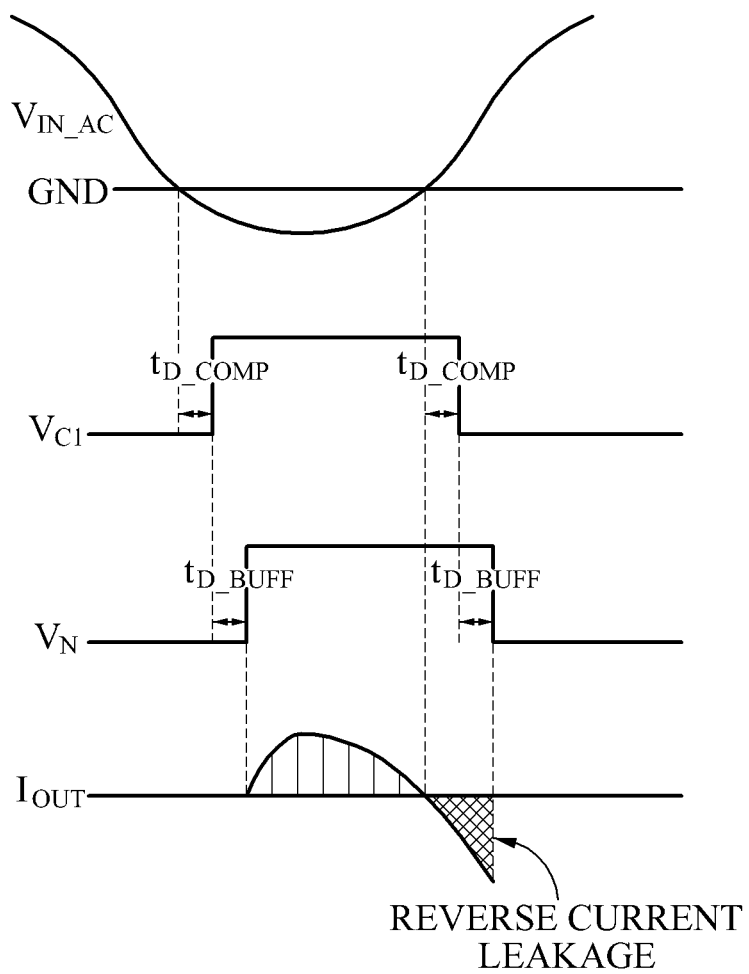
FIG. 5 illustrates an example of reverse current leakage occurring in an active rectifier according to a related art.

FIG. 5 illustrates an example of reverse current leakage occurring in an active rectifier according to a related art.

Reverse current leakage may occur in the active rectifier 400 of FIG. 4, as illustrated in FIG. 5, unlike a passive rectifier. A delay time may be caused by the comparators 411 to 414 and the buffers 421 to 424 of FIG. 4. Due to the delay time, the NMOS transistors $M_{N1}$ and $M_{N2}$ and PMOS transistor $M_{P1}$ and $M_{P2}$ of FIG. 4 may not be turned off at an exact point in time at which they are supposed to be turned off.

For example, when an NMOS transistor and a PMOS transistor are temporarily turned on at the same time, the NMOS transistor and the PMOS transistor are temporarily shorted, and accordingly reverse current leakage occurs in an active rectifier, unlike a passive rectifier. The reverse current leakage causes a power loss, and thus it may be difficult to obtain a high power conversion efficiency.

As illustrated in FIG. 5, due to a delay time $t_{D\_COMP}$ of a comparator and a delay time $t_{D\_BUFF}$ of a buffer, a transistor is turned off slightly later than a point in time at which the transistor should be turned off. Accordingly, reverse current leakage occurs in the active rectifier.

To prevent the reverse current leakage, a scheme of applying an offset voltage to a reference voltage of a comparator and turning off a transistor earlier than a point in time at which it should be turned off may be used. However, the scheme is limited to a field for transmitting an extremely small amount of power without using a butter, and it is difficult to apply the scheme to wireless power transmission of a latest mobile apparatus.

Additionally, when an amplitude of an input voltage varies during wireless power transmission, for example, due to a change in a distance between resonators, an offset voltage applied to turn off the transistor earlier will need to vary in real time. Furthermore, when the transistor is turned off earlier by applying the offset voltage, a sensitivity to voltage noise may increase, and voltage noise may easily occur due to a surrounding environment, heat, and other factors in the wireless power transmission.

Moreover, compensating for a delay of a point in time at which the transistor is turned on may be necessary. An exact point in time at which the transistor is turned is a point in time at which an output current has a value of 0. In a typical active rectifier, a transistor may be turned on at a point in time at which a long period of time has elapsed after a voltage $V_{IN\_AC}$ crosses a ground voltage GND. The delay of the point in time at which the transistor is turned on reduces a power conversion efficiency, similar to the above-described reverse current leakage.

For example, when an equal amount of current is output, and when a short period of time is required to supply a current as an output by turning on a transistor, a larger amount of current may need to be supplied at the same time. In this example, a root mean square (RMS) value of the supplied current may increase, which may result in a reduction in a power conversion efficiency.

Accordingly, in an example, when a predetermined time delay elapses from a point in time at which a transistor is turned on using a time delay, the transistor is turned off, and accordingly a delay time caused by a comparator and a buffer may be compensated for. Unlike the above-described scheme of using an offset voltage, a reverse current leakage may be reduced regardless of an external environment, for example voltage noise and other factors. Additionally, it is possible to prevent a point in time at which the transistor is turned on from being delayed.

Hereinafter, examples will be further described with reference to the accompanying drawings.

Figure 6:
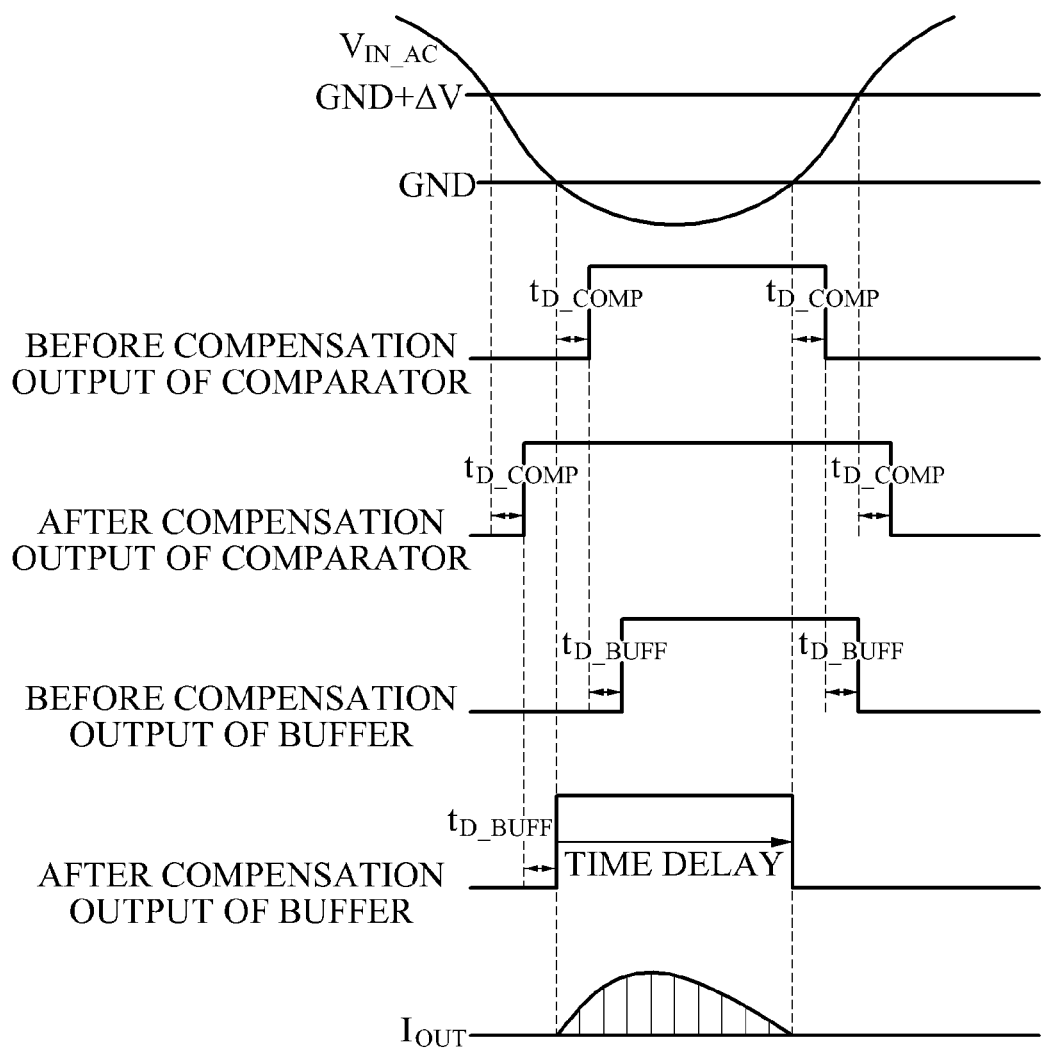
FIG. 6 illustrates an example of a method of eliminating reverse current leakage in an active rectifier.

FIG. 6 illustrates an example of a method of eliminating reverse current leakage in an active rectifier.

To compensate for the reverse current leakage in the active rectifier, a point in time at which a switch, for example a transistor, is turned off may be advanced, or a delay time caused by a comparator may be reduced. However, a delay time caused by a buffer may not be compensated for.

In an example, when a predetermined time delay is set from a point in time at which a switch is turned on, off timing of the switch may occur. Additionally, an AC input voltage $V_{IN\_AC}$ may be compared to a voltage that is higher by an offset voltage ΔV than a ground voltage GND, and the point in time at which the switch is turned on may be adjusted, for example, may not be delayed. Accordingly, all delay times may be compensated for, and thus a highest power conversion efficiency may be obtained.

In an example, regardless of an amplitude of the AC input voltage that may be easily changed during wireless power transmission, the point in time at which the switch is turned on may be adjusted without a need to adjust the offset voltage every time. Additionally, a scheme of applying a delay time may be suitable for wireless power transmission because the scheme is irrelevant to voltage noise.

Figure 7:
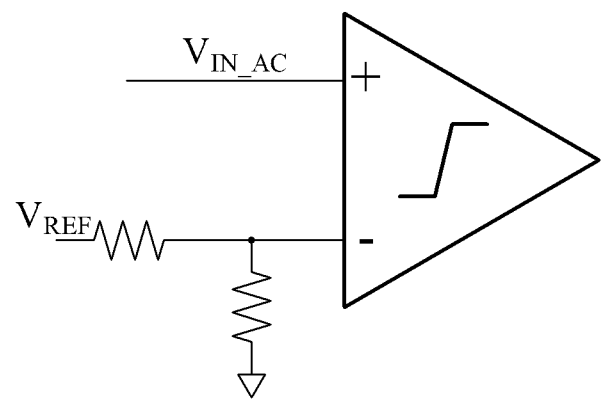
FIGS. 7 through 9 illustrate examples of a structure for adjusting a point in time at which a switch is turned on in an active rectifier.
Figure 8:
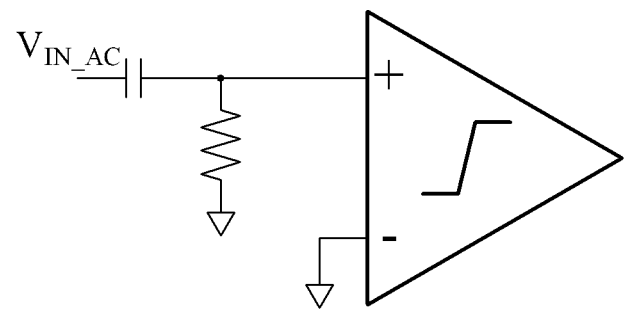
Figure 9:
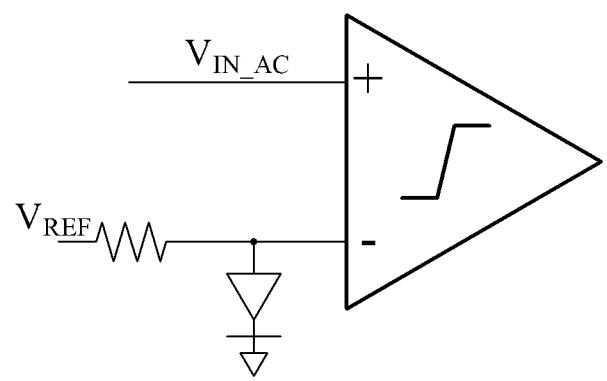

FIGS. 7 through 9 illustrate examples of a structure for adjusting a point in time at which a switch is turned on in an active rectifier.

In an example, a circuit for compensating for reverse current leakage in an active rectifier includes a comparator and a switch. The comparator is configured to adjust a reference voltage by a predetermined offset voltage to advance an output of the comparator by a predetermined period of time. The switch is turned on and off based on an output of the comparator. The predetermined offset voltage may be set by a resistor divider, or may be applied by a diode.

The predetermined period of time may be, for example, a period of time required to adjust a point in time at which the switch is turned on by a delay time caused by a buffer and the comparator so that the switch may operate at an appropriate time. The predetermined offset voltage is set so that an operation of the comparator is advanced by the predetermined period of time.

Referring to FIG. 7, an active rectifier sets an offset voltage ΔV of a comparator using a resistor divider. An AC input voltage $V_{IN\_AC}$ is compared to a voltage that is higher by the offset voltage ΔV than a ground voltage GND, and is adjusted so that the switch is turned on at a desired time. For example, the comparator outputs a result obtained by comparing the AC input voltage $V_{IN\_AC}$ to the offset voltage ΔV set by the resistor divider.

Referring to FIG. 8, an active rectifier compares a ground voltage to an AC input voltage $V_{IN\_AC}$ passing through a resistor-capacitor (RC) filter. For example, the active rectifier controls, using the RC filter, a switch to be turned on at an exact point in time after a single cycle, i.e., a single period, of $V_{IN\_AC}$ elapses. The active rectifier controls the switch to be turned on at the exact point in time in the next cycle of $V_{IN\_AC}$ based on the comparison in the current cycle of $V_{IN\_AC}$.

Referring to FIG. 9, a diode is inserted in an active rectifier. The active rectifier compares an AC input voltage $V_{IN\_AC}$ to a turn-on level of the diode, for example, about 0.7 V.

Figure 10:
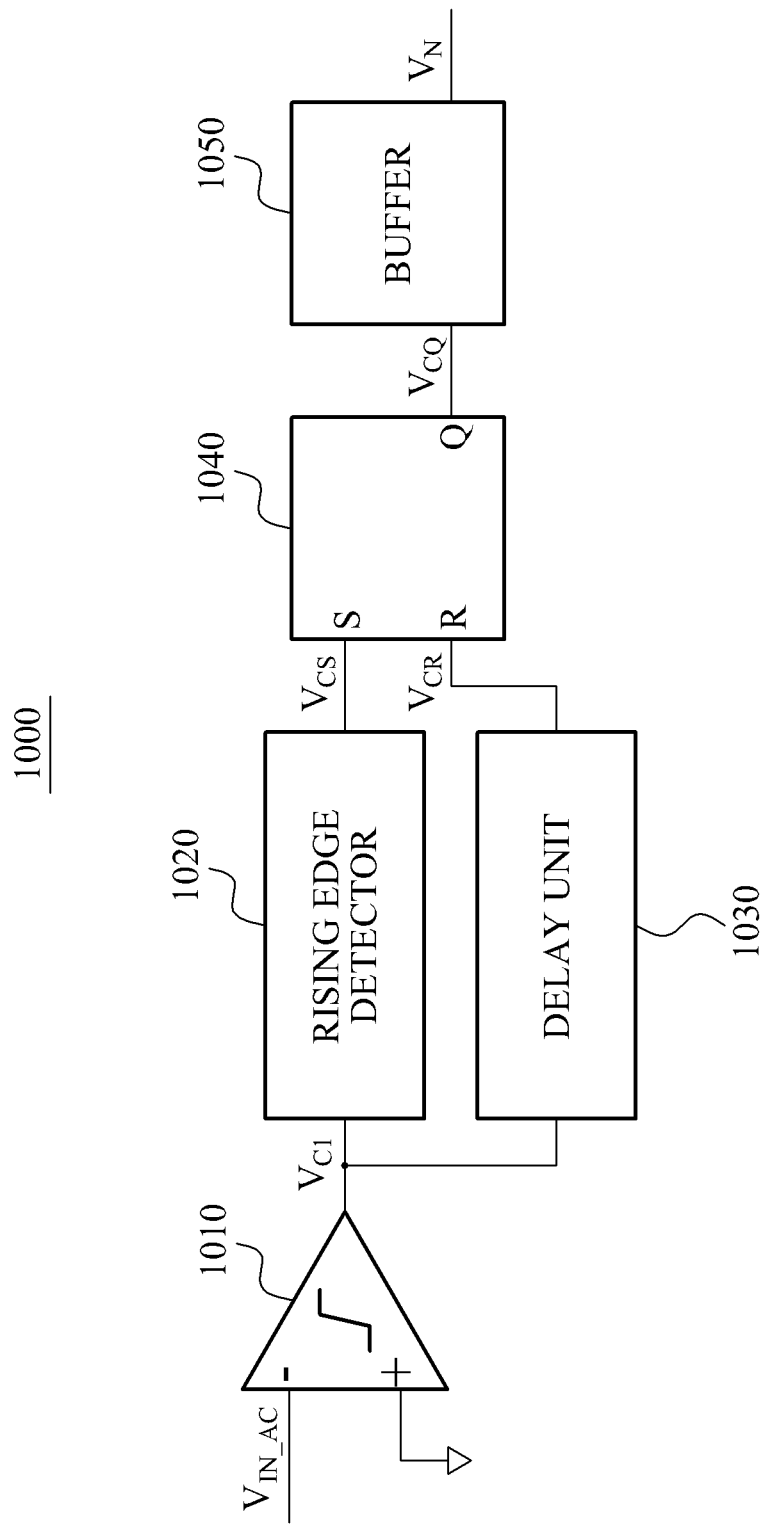
FIG. 10 illustrates an example of a structure of a reverse current leakage compensator to adjust a point in time at which a switch is turned off in an active rectifier.
Figure 11:
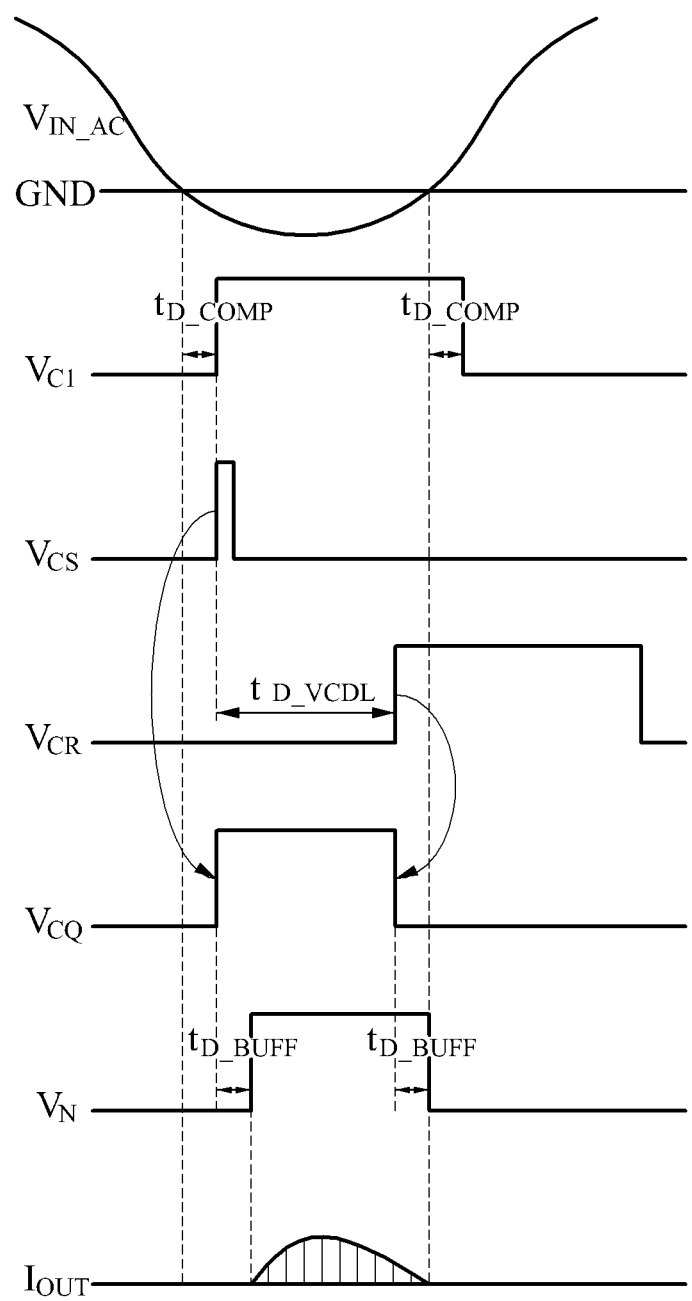
FIG. 11 illustrates an example of adjusting the point in time at which the switch is turned off in the active rectifier performed by the reverse current leakage compensator of FIG. 10.

FIG. 10 illustrates an example of a structure of a reverse current leakage compensator 1000 to adjust a point in time at which a switch is turned off in an active rectifier. FIG. 11 illustrates an example of adjusting the point in time at which the switch is turned off in the active rectifier performed by the reverse current leakage compensator 1000.

Referring to FIG. 10, the reverse current leakage compensator 1000 included in the active rectifier is designed to adjust the point in time at which the switch is turned off. As illustrated in FIG. 11, the reverse current leakage compensator 1000 adjusts the point in time at which the switch is turned off. For example, a circuit for compensating for reverse current leakage in an active rectifier includes the reverse current leakage compensator 1000. In this example, when a predetermine time delay elapses from a point in time at which the switch is turned on, the reverse current leakage compensator 1000 turns off the switch. When the switch is turned off, a current flow through the switch is interrupted.

The reverse current leakage compensator 1000 includes a rising edge detector 1020, a delay unit 1030, and a set-reset (SR) latch 1040. The rising edge detector 1020 detects a rising edge in an output $V_{C1}$ of a comparator 1010 that compares an input voltage $V_{IN\_AC}$ to a predetermined reference voltage, for example, a ground voltage GND. The delay unit 1030 outputs a signal delayed from the rising edge by a predetermined time delay. The SR latch 1040 outputs a control signal based on the rising edge and the signal delayed from the rising edge.

For example, when an output $V_{C1}$ of a comparator 1010 is delayed by the delay unit 1030 for a predetermined time delay $t_{D\_VCDL}$ from a point in time at which the output $V_{C1}$ transitions from low to high, an output $V_{CQ}$ of the SR latch 1040 transitions from high to low. In this example, the comparator 1010 receives, as an input, an AC input voltage $V_{IN\_AC}$.

The SR latch 1040 receives, as inputs, an output $V_{CS}$ of the rising edge detector 1020, and an output $V_{CR}$ delayed by the predetermined time delay $t_{D\_VCDL}$. For example, the SR latch 1040 outputs the output $V_{CQ}$ that is high in response to the output $V_{CS}$ being high and the output $V_{CR}$ being low at the point in time at which the output $V_{C1}$ transitions from low to high. When the predetermined time delay $t_{D\_VCDL}$ elapses, the output $V_{CR}$ transitions from low to high, and the output $V_{CQ}$ transitions from high to low. The SR latch 1040 prevents noise due to noise or multiple pulses in the input voltage $V_{IN\_AC}$, the output $V_{C1}$ of the comparator 1010, or the output $V_{CS}$ of the rising edge detector 1020 because once the output $V_{CQ}$ of the SR latch 1040 transitions from low to high, the output $V_{CQ}$ will not respond to any further pulses in the output $V_{CS}$ and will remain high until the output $V_{CR}$ of the delay unit 1030 transitions from low to high while the output $V_{CS}$ is low.

When a predetermined period of time corresponding to a delay time $t_{D\_BUFF}$ of a buffer 1050 elapses, the switch is turned off. Accordingly, at a point in time at which the AC input voltage $V_{IN\_AC}$ crosses the ground voltage GND, the switch is turned off. The switch is turned off at an exact point in time based on a frequency of the AC input voltage $V_{IN\_AC}$, and accordingly reverse current leakage does not occur. The buffer 1050 generates a control signal $V_N$ to turn the switch on and off. For example, in an interval in which the control signal $V_N$ is high, the switch enables a current $I_{OUT}$ to flow. A current drive efficiency of the control signal $V_N$ may enhanced compared to the output $V_{CQ}$.

Figure 12:
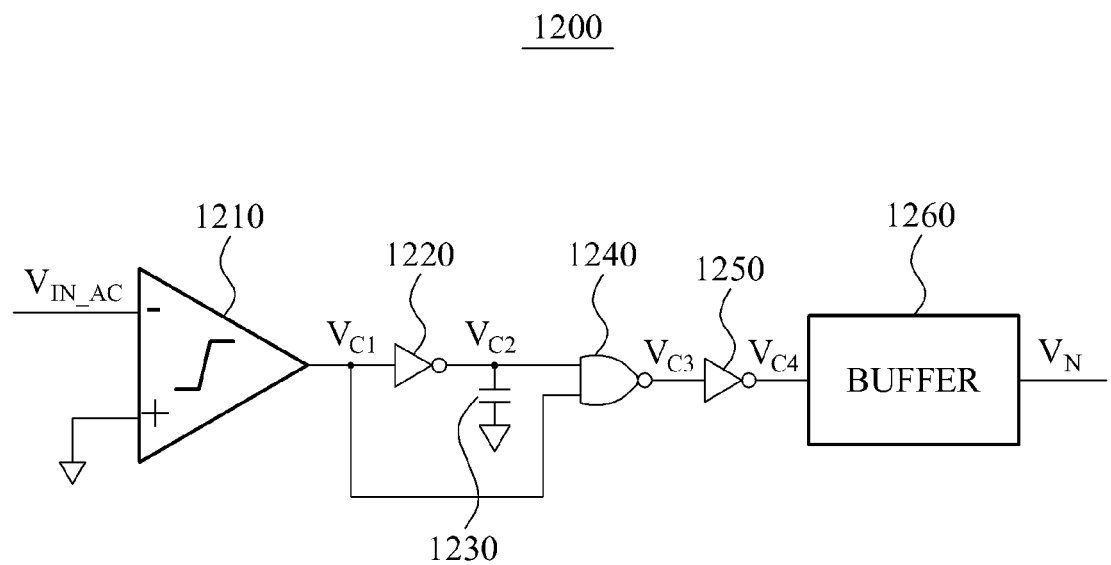
FIG. 12 illustrates another example of a structure of a reverse current leakage compensator to adjust a point in time at which a switch is turned off in an active rectifier.
Figure 13:
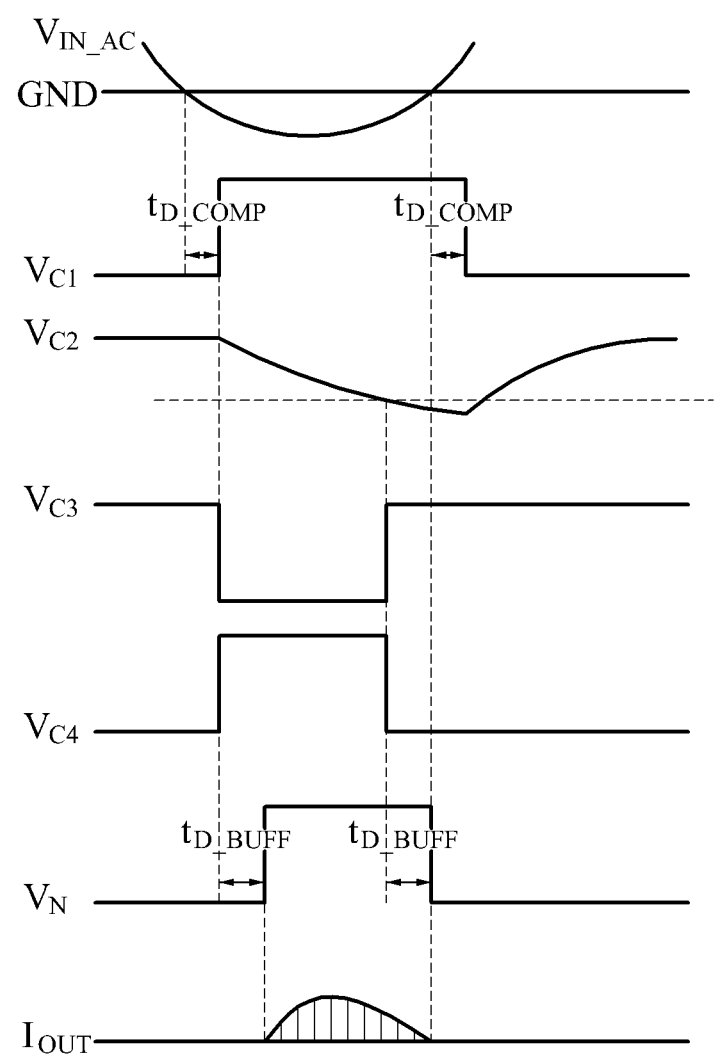
FIG. 13 illustrates an example of adjusting the point in time at which the switch is turned off in the active rectifier performed by the reverse current leakage compensator of FIG. 12.

FIG. 12 illustrates an example of a structure of a reverse current leakage compensator 1200 to adjust a point in time at which a switch is turned off in an active rectifier. FIG. 13 illustrates an example of adjusting the point in time at which the switch is turned off in the active rectifier performed by the reverse current leakage compensator 1200.

Similarly to the example of FIG. 10, the active rectifier controls the switch to be turned off when a predetermined time delay elapses from a point in time at which the switch is turned on. Referring to FIG. 12, the reverse current leakage compensator 1200 included in the active rectifier includes a comparator 1210, an inverter 1220, a capacitor 1230, and a negated AND (NAND) gate 1240.

The comparator 1210 outputs a comparison result obtained by comparing an input signal to a reference voltage. The inverter 1220 inverts an output $V_{C1}$ of the comparator 1210, i.e., the comparison result obtained by the comparator 1210. The capacitor 1230 delays an output $V_{C2}$ of the inverter 1220 by a predetermined time delay. The NAND gate 1240 outputs a control signal in response to the delayed output $V_{C2}$ and the output $V_{C1}$. The input signal includes an AC input voltage $V_{IN\_AC}$.

For example, the output $V_{C1}$ inverted by the inverter 1220 is delayed by the predetermined time delay using the capacitor 1230. The NAND gate 1240 outputs an inverted control signal $V_{C3}$ in response to the output $V_{C2}$ of the inverter 1220 delayed by the capacitor 1230 and the output $V_{C1}$ of the comparator 1210. In this example, when the output $V_{C1}$ is high and the output $V_{C2}$ of the inverter 1220 delayed by the capacitor 1230 transitions from high to low, the inverted control signal $V_{C3}$ that is high is output.

The inverted control signal $V_{C3}$ is inverted to obtain a control signal $VC_4$ by an inverter 1250. The control signal $VC_4$ is converted to a control signal $V_N$ having an enhanced current drive efficiency by a buffer 1260. Referring to FIG. 13, in an interval in which the control signal $V_N$ is high, the switch enables a current $I_{OUT}$ to flow.

Figure 14:
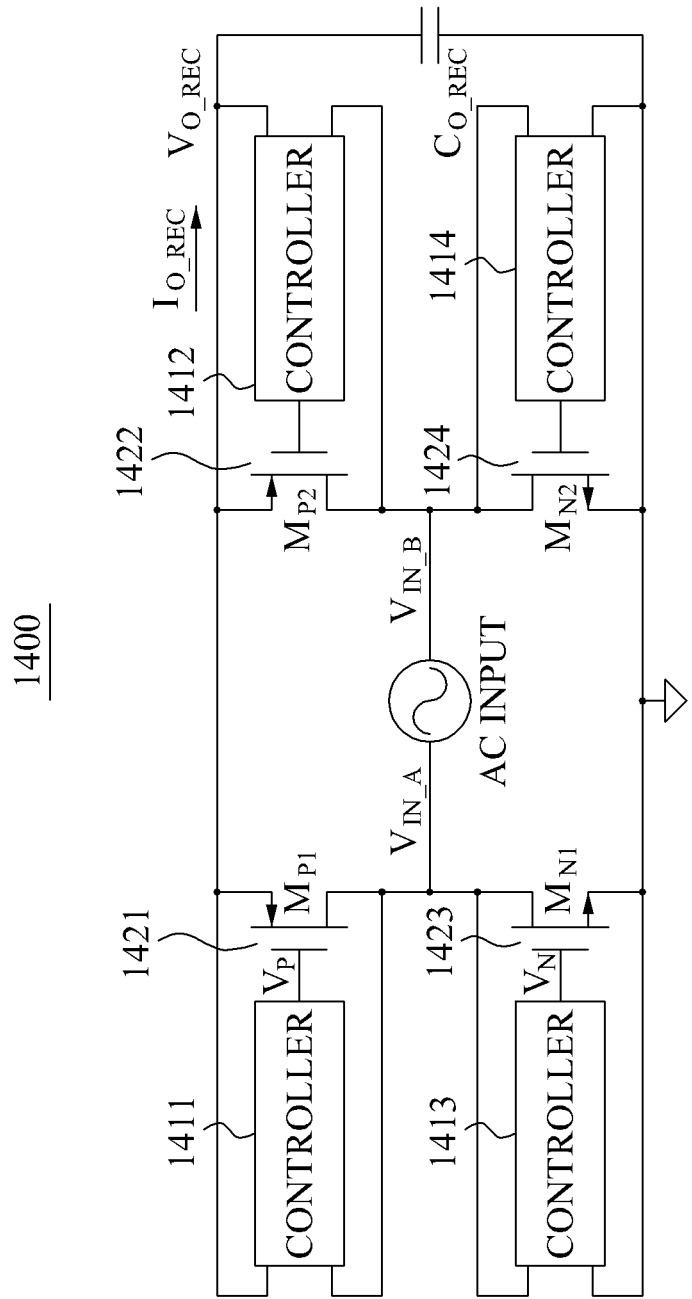
FIG. 14 illustrates an example of a structure of an active rectifier that compensates for reverse current leakage.

FIG. 14 illustrates an example of a structure of an active rectifier 1400 that compensates for reverse current leakage.

The active rectifier 1400 of FIG. 14 includes a first loop and a second loop. The first loop is activated in an interval in which an input signal has a positive phase, and enables a current to flow. The second loop is activated in an interval in which the input signal has a negative phase, and enables a current to flow. The first loop includes switches 1421 and 1424, and controllers 1411 and 1414. The second loop includes switches 1422 and 1423, and controllers 1412 and 1413. The controllers 1411 to 1414 deactivate the switches 1421 to 1424 when a predetermined time delay elapses from a point in time at which the switches 1421 to 1424 are activated. Each of the controllers 1411 to 1414 include a reverse current leakage comparator, for example, the reverse current leakage compensator 1000 of FIG. 10 or the reverse current leakage compensator 1200 of FIG. 12.

The input signal may include, for example, an AC input voltage, and voltages applied to terminals A and B of an AC input are indicated by $V_{IN\_A}$ and $V_{IN\_B}$, respectively.

The controllers 1411 to 1414 control whether the switches 1421 to 1424 are to be activated. The controllers 1411 to 1414 may each have a similar structure to the above-described structures of FIG. 10 or FIG. 12. For example, the controllers 1411 to 1414 generate a control signal to deactivate the switches 1421 to 1424 connected to the controllers 1411 to 1414 when a predetermined time delay elapses from a point in time at which the switches 1421 to 1424 are activated.

Hereinafter, activating refers to enabling a current to flow in a loop by turning on the switches 1421 to 1424, and deactivating refers to interrupting current flow in a loop by turning off the switches 1421 to 1424. An input signal may include an AC input and an AC input voltage, and a reference voltage may be, for example, a ground voltage.

In one example, each of the controllers 1411 to 1414 includes the rising edge detector 1020, the delay unit 1030, and the SR latch 1040 of FIG. 10. In another example, each of the controllers 1411 to 1414 includes the comparator 1210, the inverter 1220, the capacitor 1230, and the NAND gate 1240 of FIG. 12. In still another example, each of the controllers 1411 to 1414 may advance an output obtained by comparing the input signal to the reference voltage by a predetermined period of time using any of the comparators of FIGS. 7 through 9.

For example, each of the switches 1421 to 1424 may enable a current and a voltage to flow in each of the first loop and the second loop in response to a control signal (for example, $V_P$ and $V_N$), so that the active rectifier 1400 may store a power of the interval in which the input signal has the positive phase and a power of the interval in which the input signal has the negative phase in a capacitor $C_{O\_REC}$ based on a frequency of the input signal, that is, the AC input. Referring to FIG. 14, the switches 1421 to 1424 include PMOS transistors $M_{P1}$ and $M_{P2}$, and NMOS transistors $M_{N1}$ and $M_{N2}$, respectively.

In this example, the switches 1421 and 1424 of the first loop, and the switches 1422 and 1423 of the second loop, are activated alternately at the interval in which the input signal has the positive phase and the interval in which the input signal has the negative phase, and accordingly power of a voltage $V_{O\_REC}$ and current $I_{O\_REC}$ is stored in the capacitor $C_{O\_REC}$. The first loop includes the PMOS transistor $M_{P1}$ and the NMOS transistor $M_{N2}$ as the switches 1421 and 1424, and the second loop includes the PMOS transistor $M_{P2}$ and the NMOS transistor $M_{N1}$ as the switches 1422 and 1423.

In the interval in which the input signal has the positive phase, the switches 1421 and 1424, for example the PMOS transistor $M_{P1}$ and the NMOS transistor $M_{N2}$, in the first loop are activated by the controllers 1411 and 1414 that are respectively connected to the switches 1421 and 1424. In the interval in which the input signal has the negative phase, the switches 1422 and 1423, for example the PMOS transistor $M_{P2}$ and the NMOS transistor $M_{N1}$, in the second loop are activated by the controllers 1412 and 1413 that are respectively connected to the switches 1422 and 1423.

Figure 15:
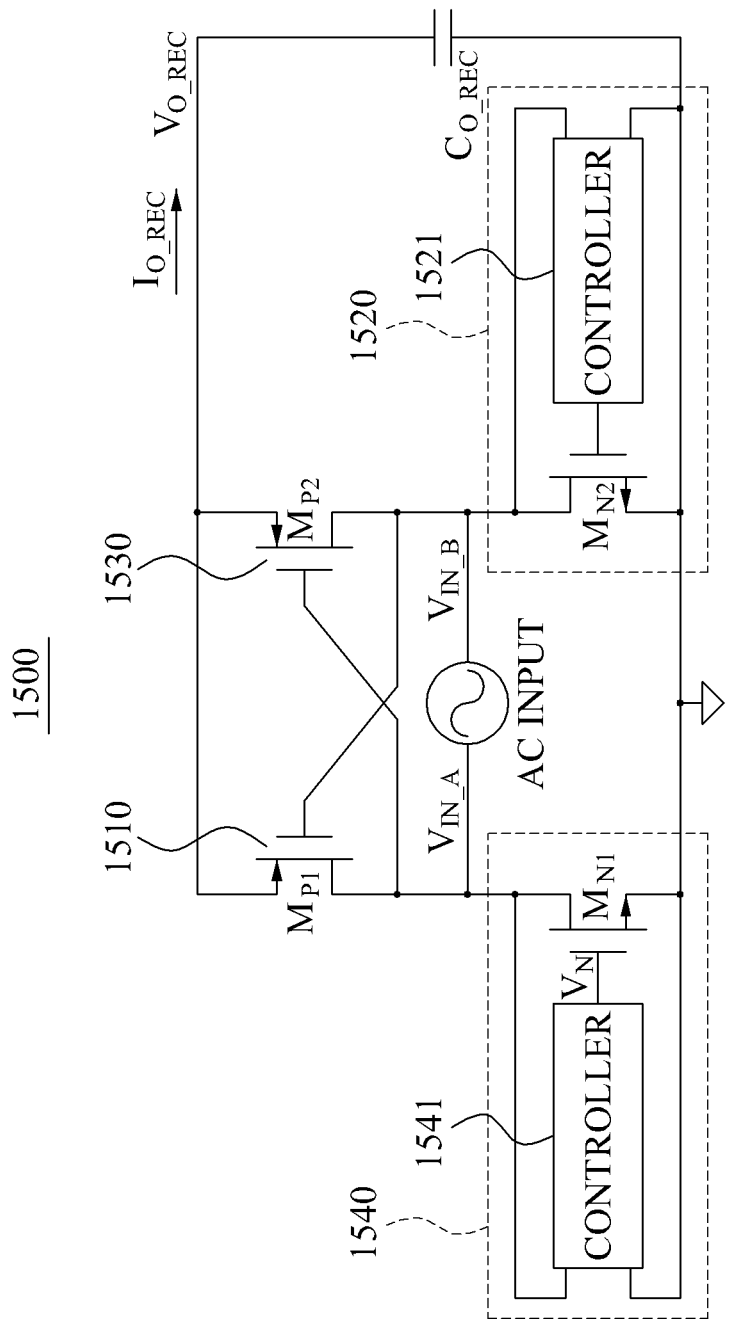
FIG. 15 illustrates another example of a structure of an active rectifier that compensates for reverse current leakage.

FIG. 15 illustrates an example of a structure of an active rectifier 1500 that compensates for reverse current leakage.

The active rectifier 1500 of FIG. 15 includes a first loop and a second loop. The first loop stores a power of an interval in which an input signal has a positive phase in a capacitor $C_{O\_REC}$. The second loop stores a power of an interval in which the input signal has a negative phase in the capacitor $C_{O\_REC}$. For example, when a predetermined time delay elapses from a point in time at which a switch is activated, each of the first loop and the second loop deactivates the switch, thereby compensating for reverse current leakage. The switch controls the active rectifier 1500.

The first loop includes a first switch 1510 and a first delay switch 1520. The first switch 1510 enables a current to flow in response to the input signal in the interval in which the input signal has the positive phase. The first delay switch 1520 interrupts the current flow in the interval in which the input signal has the positive phase when a predetermined time delay elapses from a point in time at which the first delay switch 1520 is activated.

The first delay switch 1520 includes a controller 1521. In one example, the controller 1521 includes the rising edge detector 1020, the delay unit 1030, and the SR latch 1040 of FIG. 10. In another example, the controller 1521 includes the comparator 1210, the inverter 1220, the capacitor 1230, and the NAND gate 1240 of FIG. 12.

The second loop includes a second switch 1530 and a second delay switch 1540. The second switch 1530 enables a current to flow in response to the input signal in the interval in which the input signal has the negative phase. The second delay switch 1540 interrupts the current flow in the interval in which the input signal has the negative phase when a predetermined time delay elapses from a point in time at which the second delay switch 1540 is activated.

The second delay switch 1540 includes a controller 1541. In one example, the controller 1541 includes the rising edge detector 1020, the delay unit 1030, and the SR latch 1040 of FIG. 10. In another example, the controller 1541 includes the comparator 1210, the inverter 1220, the capacitor 1230, and the NAND gate 1240 of FIG. 12.

An active rectifier according to the various examples described above is applicable to various rectifiers used to convert an AC signal to a DC signal. Additionally, a reverse current leakage comparator (for example, the reverse current leakage compensator 1000 of FIG. 10 or the reverse current leakage compensator 1200 of FIG. 12), and a controller (for example, the controllers 1411 to 1414 of FIG. 14 or the controllers 1521 and 1541 of FIG. 15) are applicable to a rectifier included in a receiver to receive a high-frequency power, for example an RF power, from a transmitter during wireless power transmission.

For example, a reverse current leakage comparator (for example, the reverse current leakage compensator 1000 of FIG. 10 or the reverse current leakage compensator 1200 of FIG. 12), and a controller (for example, the controllers 1411 to 1414 of FIG. 14 or the controllers 1521 and 1541 of FIG. 15) included in an active rectifier are applicable to a field requiring wireless power transmission, for example, an implantable microelectronic device, a mobile phone, a tablet personal computer (PC), an RFID, a smart-card, or any other device requiring wireless power transmission.

According to the various examples described above, it is possible to implement a rectifier of a wireless power transmission system with a high power conversion efficiency in high-current transmission by eliminating reverse current leakage. The high-current transmission may indicate that a current of a transmitted power is higher than a voltage. For example, a ratio of a current to a voltage (for example, expressed by I/V) that is greater than 0.2 may be considered to indicate high-current transmission.

Additionally, according to the various examples described above, it is possible to enhance a power conversion efficiency by adjusting a point in time at which a switch, for example a transistor, is turned off or deactivated.

Furthermore, according to the various examples described above, it is possible to eliminate reverse current leakage using a time delay, and accordingly a sensitivity to voltage noise occurring during wireless power transmission may be reduced.

In addition, according to the various examples described above, it is possible to easily implement an active rectifier in which reverse current leakage is eliminated using discrete elements, instead of using a complex integrated circuit (IC), and thus it is possible to reduce costs. The discrete elements may include, for example, a comparator, a driving buffer, a logic gate, and other discrete elements.

Moreover, according to the various examples described above, a reverse current leakage compensator and a controller may each include an SR latch, and thus it is possible to prevent noise caused by multiple pulses.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A circuit for compensating for reverse current leakage in an active rectifier, the circuit comprising:
   a switch configured to control a current flow in the active rectifier and interrupt the current flow in response to the switch being deactivated; and a reverse current leakage compensator configured to deactivate the switch in response to a predetermined time delay elapsing from a point in time at which the switch is activated, wherein the reverse current leakage compensator is further configured to detect a rising edge and output a control signal based on the rising edge and a signal delayed from the rising edge.

2. The circuit of claim 1, wherein the reverse current leakage compensator comprises:
a rising edge detector configured to detect the rising edge;
a delay unit configured to output the signal delayed from the rising edge by the predetermined time delay; and
a set-reset (SR) latch configured to output the control signal in response to the rising edge and the signal delayed from the rising edge.

3. The circuit of claim 1, wherein the reverse current leakage compensator comprises:
a comparator configured to output a comparison result obtained by comparing an input signal to a reference voltage;
an inverter configured to invert the output of the comparator;
a capacitor configured to delay an output of the inverter by the predetermined time delay; and
a negated AND (NAND) gate configured to output a control signal in response to the output of the inverter delayed by the capacitor and the output of the comparator.

4. The circuit of claim 1, wherein the reverse current leakage compensator comprises:
a comparator configured to adjust a reference voltage by a predetermined offset voltage to advance an output of the comparator by a predetermined period of time;
wherein the switch is further configured to be activated based on an output of the comparator.

5. The circuit of claim 4, wherein the predetermined offset voltage is applied by a resistor divider.

6. The circuit of claim 4, wherein the predetermined offset voltage is applied by a diode.

7. An active rectifier comprising:
a first loop configured to enable a current to flow in the first loop, the first loop being activated in an interval in which an input signal has a positive phase; and
a second loop configured to enable a current to flow in the second loop, the second loop being activated in an interval in which the input signal has a negative phase;
wherein each of the first loop and the second loop comprises a switch and a controller configured to generate a control signal to deactivate the switch in response to a predetermined time delay elapsing from a point in time at which the switch is activated,
wherein the controller is further configured to detect a rising edge of the input signal and output a control signal based on the rising edge and a signal delayed from the rising edge.

8. The active rectifier of claim 7, wherein the controller comprises:
a rising edge detector configured to detect the rising edge of the input signal;
a delay unit configured to output the signal delayed from the rising edge by the predetermined time delay; and
a set-reset (SR) latch configured to output the control signal in response to the rising edge and the signal delayed from the rising edge.

9. The active rectifier of claim 7, wherein the controller comprises:
a comparator configured to output a comparison result obtained by comparing the input signal to a reference voltage;
an inverter configured to invert the output of the comparator;
a capacitor configured to delay an output of the inverter by the predetermined time delay; and
a negated AND (NAND) gate configured to output a control signal in response to the output of the inverter delayed by the capacitor and the output of the comparator.

10. The active rectifier of claim 7, wherein the controller comprises:
a comparator configured to adjust a reference voltage by a predetermined offset voltage to advance an output of the comparator by a predetermined period of time, the output being obtained by comparing the input signal to the adjusted reference voltage;
wherein the switch is configured to be activated based on an output of the comparator.

11. The active rectifier of claim 10, wherein the predetermined offset voltage is applied by a resistor divider.

12. The active rectifier of claim 10, wherein the predetermined offset voltage is applied by a diode.

13. An active rectifier comprising:
a first loop configured to store a power of an interval in which an input signal has a positive phase; and
a second loop configured to store a power of an interval in which the input signal has a negative phase;
wherein each of the first loop and the second loop is further configured to deactivate a switch configured to control the active rectifier in response to a predetermined time delay elapsing from a point in time at which the switch is activated to compensate for reverse current leakage,
wherein the first loop is further configured to detect a rising edge of the input signal and output a control signal based on the rising edge and a signal delayed from the rising edge.

14. The active rectifier of claim 13, wherein the first loop comprises:
a first switch configured to enable a current to flow in the first loop in response to the input signal in the interval in which the input signal has the positive phase; and
a first delay switch configured to interrupt a current flowing in the first loop in the interval in which the input signal has the positive phase in response to a predetermined time delay elapsing from a point in time at which the first delay switch is activated.

15. The active rectifier of claim 14, wherein the first delay switch comprises:
a rising edge detector configured to detect the rising edge of the input signal;
a delay unit configured to output the signal delayed from the rising edge by the predetermined time delay; and
a set-reset (SR) latch configured to output the control signal in response to the rising edge and the signal delayed from the rising signal.

16. The active rectifier of claim 14, wherein the first delay switch comprises:
a comparator configured to output a comparison result obtained by comparing the input signal to a reference voltage;
an inverter configured to invert the output of the comparator;
a capacitor configured to delay an output of the inverter by the predetermined time delay; and a negated AND (NAND) gate configured to output a control signal in response to the output of the inverter delayed by the capacitor and the output of the comparator.

17. The active rectifier of claim 13, wherein the second loop comprises:
   a second switch configured to enable a current to flow in the second loop in response to the input signal in the interval in which the input signal has the negative phase; and
   a second delay switch configured to interrupt a current flowing in the second loop in the interval in which the input signal has the negative phase in response to a predetermined time delay elapsing from a point in time at which the second delay switch is activated.

18. The active rectifier of claim 17, wherein the second delay switch comprises:
   a rising edge detector configured to detect a rising edge of the input signal;
   a delay unit configured to output a signal delayed from the rising edge by the predetermined time delay; and
   a set-reset (SR) latch configured to output a control signal in response to the rising edge and the signal delayed from the rising edge.

19. The active rectifier of claim 17, wherein the second delay switch comprises:
   a comparator configured to output a comparison result obtained by comparing the input signal to a reference voltage;
   an inverter configured to invert the output of the comparator;
   a capacitor configured to delay an output of the inverter by the predetermined time delay; and
   a negated AND (NAND) gate configured to output a control signal in response to the output of the inverter delayed by the capacitor and the output of the comparator.

20. A circuit for compensating for reverse current leakage in an active rectifier, the circuit comprising:
   a switch configured to control a flow of current in the active rectifier; and
   a controller configured to turn off the switch to interrupt a current flowing in the active rectifier while compensating for a switch turn-off delay time of the controller to compensate for reverse current leakage in the active rectifier,
   wherein the controller is further configured to turn off the switch after a predetermined time delay has elapsed after the switch was turned on,
   wherein the controller is further configured to detect a rising edge and output a control signal based on the rising edge and a signal delayed from the rising edge.

21. The circuit of claim 20, wherein the controller comprises a comparator configured to compare an input voltage of the active rectifier to a reference voltage; and
   the predetermined time delay is selected so that the switch is turned off at a point in time at which the input voltage is equal to the reference voltage to compensate for the switch turn-off delay time of the active rectifier and compensate for the reverse current leakage in the active rectifier.

22. The circuit of claim 20, wherein the controller is further configured to turn on the switch to enable a current to flow in the active rectifier while compensating for a switch turn-on delay time of the controller to increase a power conversion efficiency of the active rectifier.

23. The circuit of claim 22, wherein the controller comprises:
   a comparator configured to compare an input voltage of the active rectifier to a reference voltage; and
   a reference voltage adjuster configured to apply a predetermined offset voltage to the reference voltage;
   the controller is further configured to turn on the switch based on an output of the comparator; and
   the predetermined offset voltage is selected so that the switch is turned on at a point in time at which the input voltage is equal to the reference voltage to increase the power conversion efficiency of the active rectifier and compensate for the switch turn-on delay time of the controller.

* * * * *